United States Patent [19]
Bryson

[11] 3,830,311
[45] Aug. 20, 1974

[54] UNIVERSAL TOOL CARRIER

[76] Inventor: Frank J. Bryson, Rural Rt. 2, Littlefield, Tex. 79339

[22] Filed: Apr. 27, 1972

[21] Appl. No.: 248,054

[52] U.S. Cl............... 172/153, 172/188, 172/393, 172/417, 172/776
[51] Int. Cl.................... A01b 49/02, A01b 5/00
[58] Field of Search ......... 172/130, 140, 188, 190, 172/191, 239, 382, 393, 397, 417, 427, 776, 152-154

[56] References Cited
UNITED STATES PATENTS

| | | | |
|---|---|---|---|
| 1,679,639 | 8/1928 | Thompson | 172/191 X |
| 1,888,502 | 11/1932 | Holstein | 172/130 |
| 2,046,211 | 6/1936 | Rutherford et al. | 172/188 X |
| 2,782,703 | 2/1957 | Chambers et al. | 172/239 X |
| 2,899,776 | 8/1959 | Arnold | 172/239 X |
| 3,052,306 | 9/1962 | Lynch | 172/140 |
| 3,437,061 | 4/1969 | Wells | 172/190 X |
| 3,559,747 | 2/1971 | Cline | 172/427 X |
| 3,575,242 | 4/1971 | Olsson | 172/130 |
| 3,578,089 | 5/1971 | Fischer et al. | 172/776 X |
| 3,680,648 | 8/1972 | Tonsfeldt | 172/417 X |

FOREIGN PATENTS OR APPLICATIONS

| | | | |
|---|---|---|---|
| 568,625 | 4/1945 | Great Britain | 172/417 |
| 654,539 | 6/1951 | Great Britain | 172/190 |
| 688,710 | 4/1930 | France | 172/417 |
| 484,200 | 10/1929 | Germany | 172/239 |
| 1,053,835 | 3/1959 | Germany | 172/239 |
| 1,186,252 | 1/1965 | Germany | 172/705 |

Primary Examiner—Robert E. Pulfrey
Assistant Examiner—Paul T. Sewell
Attorney, Agent, or Firm—Fishburn, Gold & Litman

[57] ABSTRACT

The invention includes a frame structure having ground wheels for supporting the same and adapted to be attached to a tractor and pulled across a field. The frame has a plurality of members or boxes spaced laterally of the frame and to which may be attached planting equipment for various types of seeds, fertilizing equipment, tillage tools, herbicides, cultivating equipment and the like merely by apparatus which is quickly and easily attached and detached from the carrier boxes. The apparatus also includes marking devices whereby the field may be marked before planting or it may be marked while planting so that the rows will be equally spaced apart to provide for cultivation and other equipment. Hydraulic power means is provided for raising the planting and cultivating equipment or other tools out of the ground and also for raising and lowering the marking attachments, the power means being operatorally connected to the tractor. Means is provided for limiting the depth of the implements with respect to the surface of the ground.

1 Claim, 10 Drawing Figures

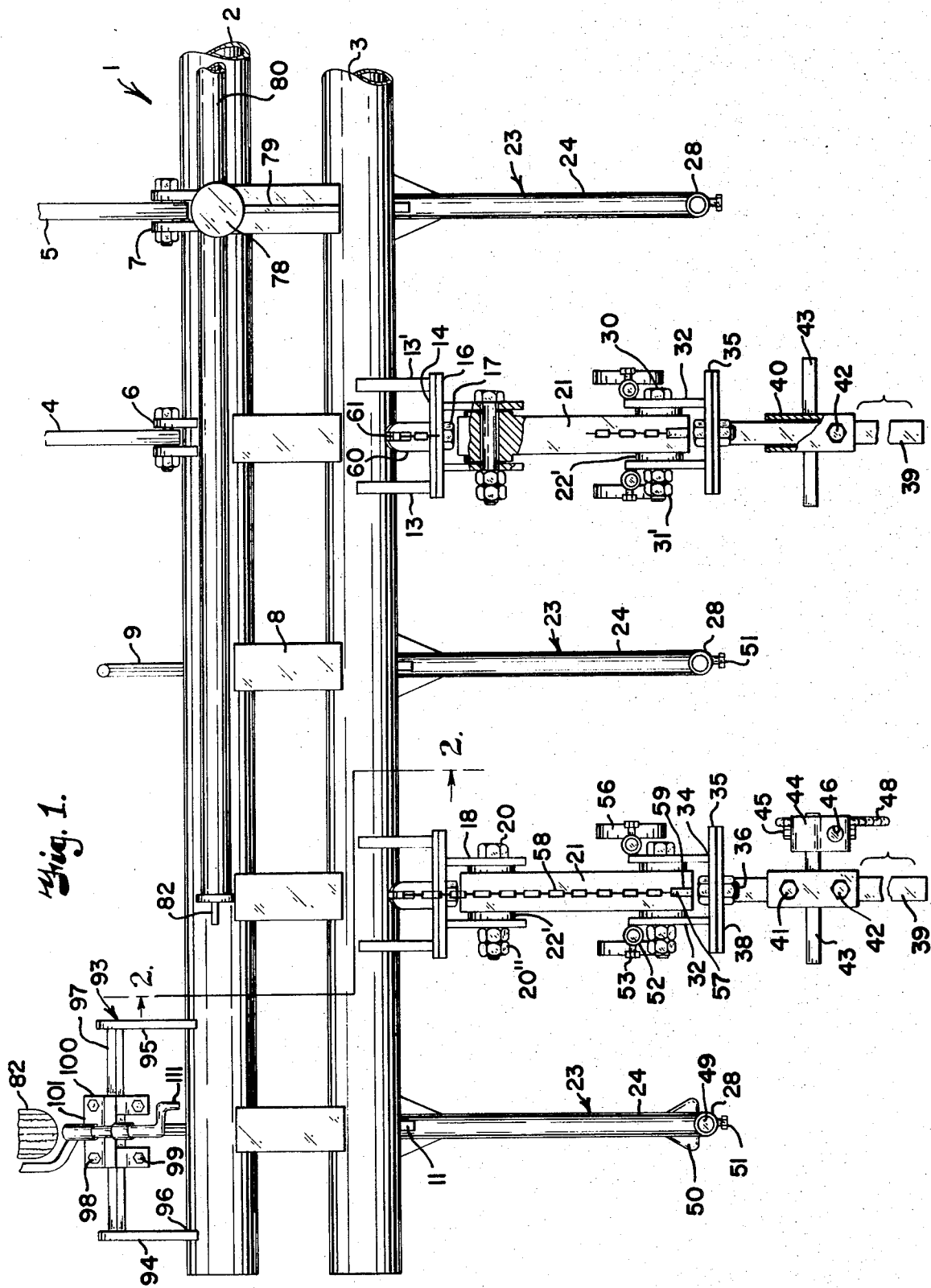

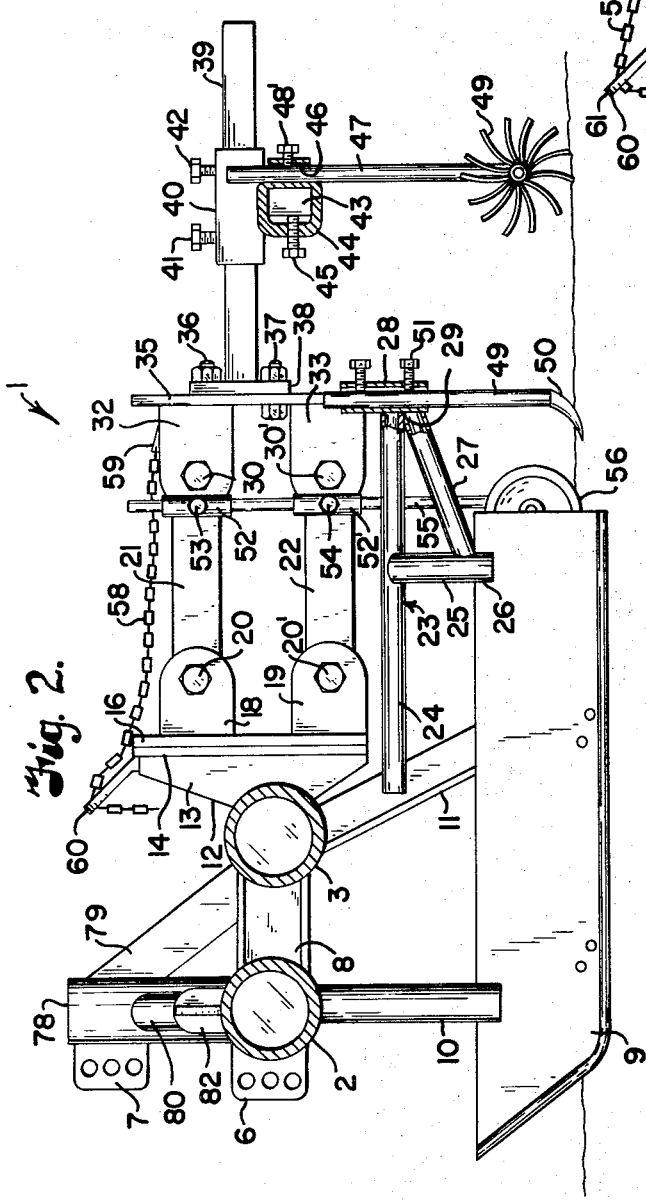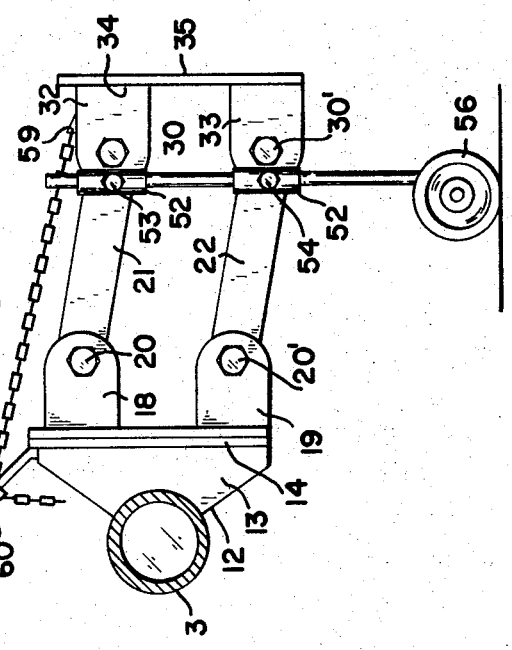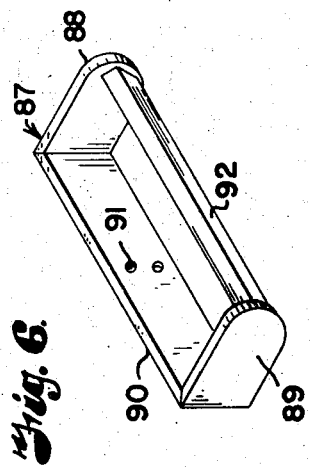

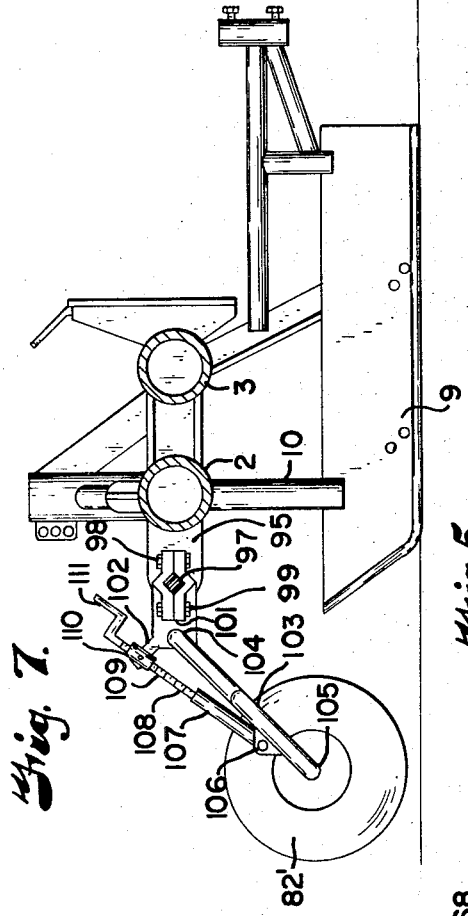
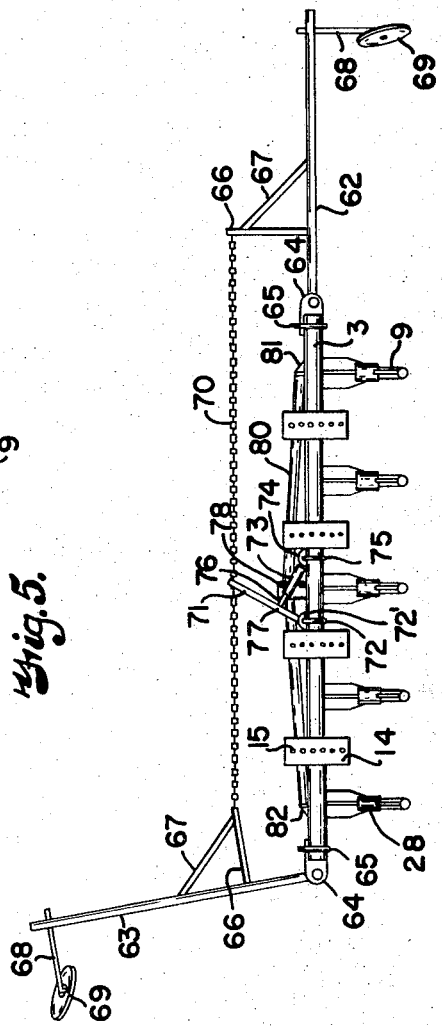
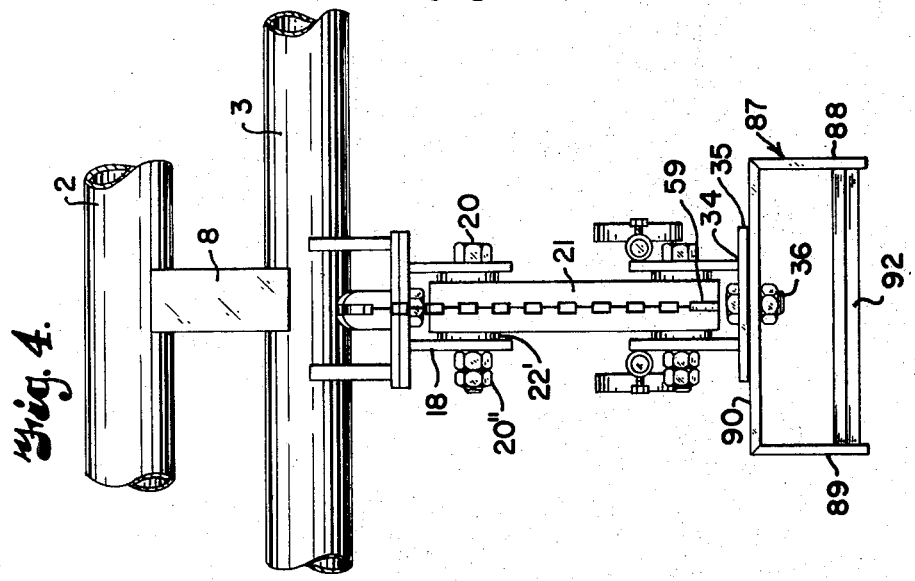

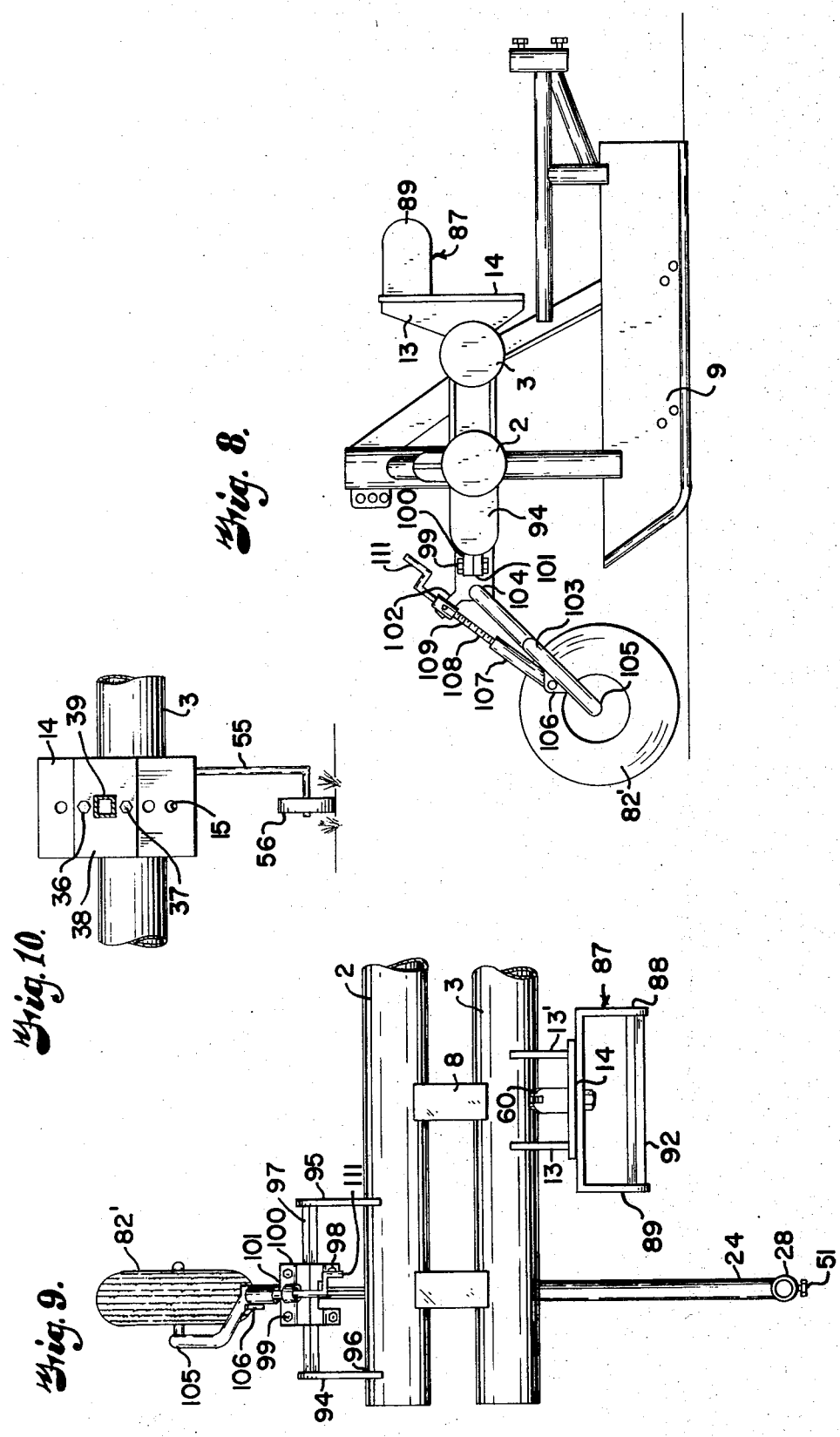

UNIVERSAL TOOL CARRIER

In the planting and cultivating of crops, a high degree of control of the equipment must be exercised. The operator desires to cover more ground in a shorter time and long and rigidly attached tool bars are common. The long tool bars move up and down with the contour of the ground and tillage equipment frequently is not in the ground. The rear axle of the tractor is the fulcrum point of the tool bar, which is usually of some length rearwardly of the axle, to react accordingly, thus causing unevenness of the tillage tools carried by the tool bar with respect to the ground.

Various mechanisms have been provided for frames or carriers to be pulled by tractors and the like and to which are attached various planters, plow shovels, tillers and the like, but as far as applicant knows none of these former apparatuses have been or are available wherein the versatility of applicant's apparatus is provided. It is well known with scarce labor and high wages the old and cumbersome attachments have needed refinement. Applicant has improved over these old methods by providing an attachment for planters and tillage tools which provide a floating action of the equipment so as to conform to the contour of the ground and assure the desired contact of the equipment with respect to the ground even though the wheels of the frame structure and the tractor move over uneven ground. The principal object of the present invention is to provide a universal tool carrier or a carrier whereby the tool or apparatus to be used may be quickly attached and removed from the carrier and reattached or other equipment attached in its place.

Other objects of the present invention are to provide apparatus for planting one or two rows of seed as desired and to provide wheels adjustable on the frame for limiting the depth to which the seed is planted; to provide for attachment of a tillage tool adapted to plow or dig and whereby the wheel for gauging the depth of the tool may be changed as desired; to provide apparatus whereby two wheel spaced apart apparatus may be quickly changed to one wheel to accommodate either one or two rows.

Other objects of the present invention are to provide skids or stabilizing runners between each tool being used to conform to the contour of the ground and provide stability to the structure. It is obvious that the longer a tool bar the more liklihood of the bar's moving up and down as the tractor moves over rough and uneven field conditions so that the tillage tools very frequently do not run at the same depth in the ground. It is therefore a further object of the invention to control the cultivating and tillage problem wherein the wheels are adjustable for engaging the ground or limiting the depth of the tool and this in combination with the skids will permit the gauge wheels to be directly at the point of tillage permitting a stable work platform suitable for attaching any number of tools.

Other objects of the invention are to provide a parallelogram arrangement for mounting of the tools and gauge wheels; to provide an auxiliary tool bar for attaching to the tool carrying apparatus and vertical adjustment thereof so that the mechanism will be in a near horizontal plane.

Still further objects of the present invention are to provide the box attaching mechanism with means for setting the depth of the implement or tillage tool to engage in the ground; to provide means for raising the frame with its attendant tools attached thereon out of the ground; to provide means for holding the attachments free of the ground after they are raised; to provide means for controlling the depth of the tools in relation to the plant row with a minimum tillage next to the plant to prevent root pruning and cutting and permitting close to crop tillage and cover small weeds in the plant row without covering the plants; to provide for use of two gauge wheels for regular row crop or for a single gauge wheel for narrow row crops; to provide a device which provides for quick change over from one tool to another and to provide a device of this character simple and economical to manufacture.

Other objects of the invention are to provide marking devices pivotally mounted on each end of the frame structure rotatable vertically with respect to the frame, and hydraulic means operable from the tractor for raising and lowering said marking devices.

Other objects and advantages of this invention will become apparent from the following description taken in connection with the accompanying drawings wherein are set forth by way of illustration and example certain embodiments of this invention.

FIG. 1 is a fragmentary plan view particularly illustrating the parallel carrier members and the attachment of the equipment thereto.

FIG. 2 is a fragmentary, side elevation, view particularly illustrating the attachment features of the invention and the runners for stabilizing the same.

FIG. 3 is a fragmentary, side elevational, view particularly illustrating the parallelogram arrangement and the gauge wheels.

FIG. 4 is a fragmentary view illustrating a modified form of the attachment features.

FIG. 5 is a rear elevational view of the marking apparatus and the attachment for the planting or tillage equipment removed.

FIG. 6 is a perspective view of a modified tool bar attachment.

FIG. 7 is a side elevational sectional view showing mounting frame supporting wheels.

FIG. 8 is an end elevation showing modified tool carrier.

FIG. 9 is a fragmentary section of top plan view of the wheel mounting and modified tool mounting plate and tool bar.

FIG. 10 is an end elevation showing only one gauge wheel for double row crop.

As required detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

Referring more in detail to the drawings:

1 designates a frame for the apparatus embodying the features of my invention, comprising a front carrier bar 2 and a rear carrier bar 3 extending parallel to each other and transversely to the movement of a tractor (not shown) to which the apparatus is attached usually by a three point hitch as indicated by arms 4 and 5 which are attached to the front carrier bar 2 as indicated at 6 and 7. The carrier bars are attached by spaced tie bars 8. The number of tie bars required depends on the length of the carrier bars.

The apparatus is designed for an implement constructed in four, six, eight or more rows to be planted, usually an even number and I provide runners or skids 9 spaced between the attaching boxes, thus requiring one more skid than the number of implements to be attached to the carrier bars for stabilizing the equipment. The runners 9 are attached underneath the carrier bars 2 and 3 by attaching legs 10 and 11, the latter being attached to the rear carrier bar 3 and is set at an angle thereunder as shown in FIG. 2. These parts so far described are all attached together rigidly by welding.

One of the principal features of this invention resides in what is termed "carrier boxes" 12 and a plurality of these boxes are used one for every implement to be carried on the tool carriers and are spaced along the rear tool carrier 3. The boxes are usually on a regular 40 inch row center. These boxes consist of spaced plate members 13 and 13' having a portion cut away as shown in FIG. 2 to engage the rear carrier member 3 by welding or the like, and secured to the rearwardly extending edges of these plates is a plate member 14, and as shown in FIG. 5 a plurality of openings 15 are provided for adjustment of a tool bar of an implement to be carried thereon as later described. The carrier bars are shown as tubular, but other configurations may be used as desired.

Rigidly secured to the plate 14 is a plate 16 and may be secured to the plate 14 by bolts or the like as indicated at 17 engaging in the openings 15. Extending rearwardly from the plate 16 are spaced guide plates 18 and 19. There are two pairs of these guide plates, upper guide plates (18), and lower guide plate (19) as shown in FIG. 2. The upper and lower guide plate 18 and 19 have aligned openings for receiving bolts 20 and 20' which include a lock nut 20'' to allow free rotation of tube members 21 and 22 attached to the upper and lower guide plates as shown so that the tube members may move up and down at their rear ends as desired. Wear plates 22' are welded on each side of the tube members 21 and 22 to provide wear surfaces in contact with the guide plates 18, 19, 32 and 33. In use the lock nuts 20'', are not tightened to a point of tightness but they need to be loose enough to allow rotation up and down of the rear ends of the tube members. Cotter pins or self locking nuts may be used if desired to keep from losing the nuts.

23 designates a plow frame consisting of a rearwardly extending bar 24 rigidly secured to leg 11 by welding or the like. A leg 25 is connected to the stabilizing runners 9 as indicated at 26. A leg 27 connects between the leg 25 at the top of the runners as shown in FIG. 2 and extends rearwardly and upwardly and is connected to a tubular clamping member 28 by welding or other suitable means as indicated at 29. The juncture of the rear end of a leg 27 and the rear end of the leg 24 are practically together as shown in FIG. 2.

Attached to the rear ends of the tube members 21 and 22 are spaced upper and lower guide plates 32 and 33, to which is attached at the rear, by welding or the like as indicated at 34, is a plate 35. The upper and lower guide plates 32 and 33 are pivotally attached to the rear ends of the tube members 21 and 22 by a rod or bolt 30' having a lock nut 31'. This arrangement also has the wear plates 22' to provide for easy movement of the connection to aid in the floating action of the attachment. Secured to the plate 35 by bolts 36 and 37 is a plate 38 for attachment of a tool bar or tube 39 by welding or other suitable means. This tool bar extends rearwardly of the apparatus as shown in FIG. 2. Slidable on the tube or bar 39 is a sleeve member 40 and may be adjusted thereon longitudinally by set screws 41 and 42. A bar 43 is rigidly secured to the lower side of the sleeve member 40 and transversely thereof to which is mounted the earth digging or planting implements as later described.

As shown in FIGS. 1 and 2 clamping members 44 are adjustably mounted on the bar 43 by cap screws 45. The clamp includes a tubular portion 46 to receive the vertical tool rod 47 upon the lower end of which is mounted a tillage tool 48. Any kind of tillage tool may be carried on the tillage rod as desired. The rod is adjustable vertically by the set screw 48'.

Mounted in the tubular member 28 attached to the tail plow member 23 (FIG. 2) is a tool rod 49 having on the lower end thereof a digging tool or the like 50. The rod 49 is adjustable in the tube or holding clamp 28 by cap screws 51.

Mounted on the forward ends of plates 32 and 33 transversely of said plates in a vertical position are spaced sleeves 52 and 52' and adapted to be adjusted therein by cap screws 53 and 54 are shanks 55 upon the lower end of which are mounted gauge wheels 56 for gauging the depth of the tillage tools in the ground when the apparatus is in use. In FIG. 1 is illustrated two wheels used on normal one-row crop spacings. A single wheel and its mounting is used for narrow row crops, the wheel running between the rows (FIG. 10). For use with narrow row crops remove one of the gauge wheels 56 and its vertical rod 55 and rotate the other vertical rod 55 180°, which sets its guide wheel 56 between the rows.

This particular form of invention shown in FIG. 3 and the parallelogram arrangement of parts provides a floating action of the gauge wheel arrangement and the implement attachments along with the runners so that in moving over uneven ground the plow or implement will remain in the ground at the same depth at all times. It is, of course, well known that the ground over which these tools are propelled consists in some instances of alternate furrows and ridges. Runners for stabilizing the equipment run in the furrows and the implement tools run on the bed between the furrows. The runners for stabilizing the equipment are on the outside of the device and when the implement is turned at the end of the field the runner on that side to which the short turn is made moves back across the field in the same furrow to make a uniform width of row for planting or to guide the cultivating tools between the rows at a uniform width. The adjustment of the gauge wheels regulates the depth of the implements in the ground or the planting tools on the ground along with the adjustment of the plate 16 with respect to plate 14 by the bolts adjusted in the vertically spaced openings 15 in the plate 14.

When using the apparatus as shown in FIGS. 1, 2 and 3 and particularly the parallelogram arrangement for attachment of the implements including the gauge wheels I have provided means for holding the implements suspended above ground when transporting the apparatus.

In FIG. 1, 57 designates a bracket carried by the upper flex tube 21 and a chain 58 has one end secured to the bracket by any suitable means such as welding, hook and eye or the like as indicated at 59. Mounted on the plate 14 by welding or other suitable means is a bracket 60 having a grooved or forked end 61 for receiving a link of the chain therebetween and thus holding the rear portion of the parallelogram arrangement including the tools and gauge wheels out of engagement with the ground.

In operation of the implement, the gauge wheels 56 will be in firm contact with the ground. The chain 58 will be somewhat loose as shown in FIG. 2. When the complete tool bar assembly including bars 2 and 3 is raised the weight of the flexible arrangement of the parallelogram arms will naturally tend to be lowered and thus keep the gauge wheels 56 in contact with the ground. The chain 58 is preadjusted so that it will restrain the flexible members from falling down and being damaged as well as prevent damage to the crops. The chain 58 is preadjusted and changes are not required after initial adjustment.

In FIG. 5 there is illustrated a marking apparatus for use when planting or prior to planting if desired. The apparatus includes the elongated bars 62 and 63 secured at each end of the carrier bar 3 by bracket members 64 fastened to the carrier by U-bolts 65. Bars 62 and 63 are of a length half the width of the implement being used, here shown to be four attachment plates or for fastening for tools thereto and includes an upright strap 66 and brace member 67. Rigidly secured to the outer ends of the rods 62 and 63 are vertically extending rods or shafts 68 on the lower end of which are mounted discs or marking devices 69. The straps 66 are connected by a chain 70 and at substantially the center of said chain and secured thereto is a rocker arm 71 having its other end secured to the carrier 3 by U-bolt 72. A hydraulic cylinder 73 has one end rotatively mounted to a bracket 74 which in turn is secured to the carrier 3 by a U-bolt 75. The rocker arm is also attached to a bracket 72' and the free end of the rod 76 engaging in the cylinder is secured to the rocker arm as indicated at 77. When the hydraulic cylinder rod is closed one marker is on the ground to make a light cut in the soil. When the apparatus reaches the end of the field to turn the implement around, the hydraulic cylinder is operated to raise the marker and movement of the piston in the cylinder will lower the marker which has been raised as shown in FIG. 5. Downward movement of the rod 62 is accomplished by extension of the ram rod in the cylinder.

In order to lend rigidity to the structure, I provide at substantially the center of the front carrier arm a standard or post 78, and a brace 79 extends between the rear carrier rod 3 and the upper portion of the post. This post is in line with one of the tractor hitches 5 as shown in FIG. 1. The device includes an elongated strap member 80 having its ends secured to the post 2 by welding or other suitable means as shown at 81 and 82 (FIG. 5). The strap is secured on each side of the post 78 by welding to form the rigid structure. If desired verticle posts may extend between the structure member 80 at spaced intervals with the lower ends attached to the carrier rod 2.

In the structure illustrated for supporting the frame and its appertinances over the ground I provide spaced wheels 82' which are secured to the forward carrier bar 2 by a forwardly extending bracket 93 (FIG. 1) and which includes spaced plates 94 and 95 welded to said bar as shown at 96. Rigidly secured to the outer ends of the plates 94 and 95 is a tool bar 97, here attached to the tool bar 97, by bolts 98 and 99 is a clamp 100 having a forwardly extending portion 101 and a forwardly extending bracket 102. An arm 103 is pivotally attached at 104 to the extension member 101 and its free end 105 forms an axle for the wheel 82'. Rigidly attached to the arm 103 is a bracket 106 to which is pivotally attached to the forward end of a crank mechanism 107 consisting of a rod 108 threaded at 109 and engaging in a threaded sleeve member 110 pivotally mounted on the bracket 102. The rod 108 has a crank 111 whereby operation of the crank will raise and lower the wheel with respect to the frame.

The wheel assembly just described are mounted on the frame in alignment with the outermost runners as illustrated in FIG. 9.

In FIGS. 8 and 9 I have shown a modified attachment of the modified tool bar 87 shown in FIG. 6 and it is particularly adapted for mounting of a planter attachment thereto although other equipment may be used in connection with this particular tool bar. The tool bar 87 is attached to plate 14 which in turn is rigidly attached to the spaced plate members 13 and 13' rigidly attached to bar 3 between the sled runners 9.

It will be obvious that this modified arrangement may be utilized with the planter attachment in connection with the ground engaging tool.

With the invention thus far described it will be obvious that I have provided an attachment for various implements to a carrier bar of a frame mechanism to be transported by a tractor. No claim is made to the tractor or its suspension mounting to the frame except in the combination. The parallelogram arrangement for fastening the implements and particularly ground digging implements to the attachment on the carrier bar is believed to be unique and not taught by anyone heretofore.

In FIG. 6, I have shown a modified form of tool bar which is particularly adapted to be attached to the rear plate 14 of the carrier box 12 and this tool bar consists of a U-shaped member 87 comprising arms 88 and 89 connected by the bar 90 provided with spaced openings 91 for adjustment of the tool bar to the carrier box through openings 15 in the plate as shown in FIG. 5. Arms 88 and 89 are connected by a bar 92 to which an implement (not shown) may be attached. This tool bar arrangement is particularly adapted to a planter attachment, a lister, a fertilizer attachment, a herbicide attachment or other such attachments for planting, fertilizing and sterilizing the soil of weeds. With this form of tool bar connection the floating parallelogram is not used and the chain arrangement is also not used.

It will be obvious from the description of the preferred forms of the invention including the parallelogram arrangement for the tools and gauge wheels the weight of such implements will carry the tools into the ground and they are held at proper engagement with the ground by the gauge wheels. With the particular tool bar arrangement shown in FIG. 6 the skids 9 will aid in limiting the depth of the tools or planters used and the hydraulic or 3-point hitch also may be used to regulate the depth of planting. It will be obvious that middle "Buster" plows may also be used on the tool bar shown in FIG. 6. Bar 92 of tool bar 87 and bar 97 are all 2¼ inches X 2¼ inches square steel bar material or sheet tube welded to their respective parts so that they appear here in diamond shape position. The planter or other tools, of course, is adjusted by the openings 91 in both the tool bar and on the carrier plate 14 as above described.

It will be obvious from the foregoing that I have provided an improved attachment for planting and tillage of row crops which is quickly and easily assembled and requires less time to accomplish this purpose as well as cheaper to manufacture.

It is to be understood that while I have illustrated and described one form of my invention it is not to be limited to specific form or arrangement of the parts herein described and shown insofar as such limitations are included within the claim.

What we claim and desire to secure by Letters Patent is:

1. A tool carrier for a ground working and planting apparatus comprising:
   a. a frame adapted to be connected to a tractor and having laterally spaced ground engaging wheels mounted at a forward portion of said frame for supporting same, said frame having means thereon and operatively connected to said wheels for raising and lowering same with respect to said frame, said frame including parallel front and rear carrier bars, said front and rear carrier bars being elongated transversely of the direction of travel of the tractor;
   b. a plurality of laterally spaced tool carriers rigidly mounted on said rear carrier bar, each tool carrier extending rearwardly from said rear carrier bar;
   c. rearwardly extending upper and lower guide plates for each of said tool carriers and removably mounted thereon;
   d. an upper and lower tube member for each of said tool carriers and each having a forward end thereof pivotally mounted on a respective one of said rearwardly extending upper and lower guide plates;
   e. forwardly extending upper guide plates for and pivotally mounted on a rear end of each of said upper tube members and forwardly extending lower guide plates for and pivotally mounted on a rear end of each of said lower tube members;
   f. a rear plate for and connected to respective upper guide plates and lower guide plates to form a parallelogram arrangement extending rearwardly from each of said tool carriers;
   g. at least one ground engaging wheel for and adjustably mounted on and depending from at least one of said upper guide plates and lower guide plates of each of said parallelogram arrangements whereby a floating action is provided for each of said parallelogram arrangements so that said respective rear plate remains in the same spaced relation with the ground when said frame is moving over uneven ground;
   h. means on and extending between each of said tool carriers and the rear end of said respective upper tube member for holding said respective parallelogram arrangements in raised position;
   i. a plurality of ground engaging implements;
   j. means extending rearwardly from each of said parallelogram arrangements for mounting a respective one of said implements thereon whereby the floating action of said respective parallelogram arrangements maintains said implements the same depth in the ground when said frame is moving over uneven ground;
   k. a plurality of spaced ground engaging runners and means rigidly mounting same on said front and rear carrier bars, said runners being alternately spaced with said tool carriers and arranged with one more runner than ground engaging implements for stabilizing said frame and implements;
   l. a substantially rigid plow frame for and aligned with each of said runners and said means rigidly mounted on said respective runners and said means rigidly mounting same on said front and rear carrier bars and each having a tubular clamping member secured to a rear end thereof, said clamping members each being positioned rearwardly of said respective runner;
   m. a vertically extending tool rod for each of said tubular clamping members and means adjustably mounting and tool rods in said respective clamping members; and
   n. a ground digging tool for each of said tool rods and mounted on the lower end thereof.

* * * * *